(12) United States Patent
Kayali et al.

(10) Patent No.: US 7,264,673 B2
(45) Date of Patent: *Sep. 4, 2007

(54) MANUFACTURE OF ARTICLES FROM FLY ASH

(75) Inventors: Obada Kayali, Canberra (AU); Karl John Shaw, Canberra (AU)

(73) Assignee: Unisearch Limited, Sydney (AU)

( * ) Notice: Subject to any disclaimer, the term of this patent is extended or adjusted under 35 U.S.C. 154(b) by 119 days.

This patent is subject to a terminal disclaimer.

(21) Appl. No.: 10/721,581

(22) Filed: Nov. 24, 2003

(65) Prior Publication Data

US 2005/0109242 A1 May 26, 2005

Related U.S. Application Data

(63) Continuation-in-part of application No. 09/996,528, filed on Nov. 28, 2001, now Pat. No. 6,802,896.

(30) Foreign Application Priority Data

Oct. 3, 2003 (AU) .............. 2003905445

(51) Int. Cl.
*C04B 14/00* (2006.01)
(52) U.S. Cl. .............. 106/705; 106/DIG. 1; 264/333; 264/DIG. 49
(58) Field of Classification Search .............. 264/660, 264/666, 675; 106/DIG. 1
See application file for complete search history.

(56) References Cited

U.S. PATENT DOCUMENTS

| | | | |
|---|---|---|---|
| 2,576,565 A | * | 11/1951 | Brown |
| 2,724,656 A | | 11/1955 | Gunzelmann |
| 3,354,245 A | * | 11/1967 | Foster |
| 3,374,101 A | * | 3/1968 | Ban et al. |
| 4,043,831 A | * | 8/1977 | Friedman ............... 106/DIG. 1 |
| 4,772,330 A | * | 9/1988 | Kobayashi et al. ......... 106/400 |
| 4,885,203 A | | 12/1989 | Wakat |
| 5,211,750 A | | 5/1993 | Smith |
| 5,350,549 A | | 9/1994 | Boyle |
| 5,374,307 A | | 12/1994 | Riddle |
| 5,521,132 A | * | 5/1996 | Talmy et al. ............... 501/155 |

(Continued)

FOREIGN PATENT DOCUMENTS

CN 1102822 5/1995

(Continued)

*Primary Examiner*—Paul Marcantoni
(74) *Attorney, Agent, or Firm*—Kelly Lowry & Kelley LLP (57) ABSTRACT

The present invention provides a method of forming a shaped article having a matrix that contains sintered fly ash. The method comprises the step of blending fly ash together with water to produce a fly ash dough. The water is added in excess of that which is absorbed by the fly ash so that the dough contains free water so as to be in at least a partially fluid state. The method also comprises the steps of forming a green article in a desired shape from the fly ash dough, and removing at least a portion of the free water from the fly ash dough during and/or after forming of the green article. The green article is subsequently fired so that the shaped article is hardened by sintering its fly ash matrix.

The present invention also provides a building element having a matrix of sintered fly ash.

18 Claims, 7 Drawing Sheets

U.S. PATENT DOCUMENTS

| | | | |
|---|---|---|---|
| 5,583,079 A * | 12/1996 | Golitz et al. | ................ 501/32 |
| 5,584,895 A | 12/1996 | Seike | |
| 5,665,290 A | 9/1997 | Koslowski | |
| 6,054,074 A | 4/2000 | Wu | |
| 6,068,803 A | 5/2000 | Weyand | |
| 6,277,189 B1 | 8/2001 | Chugh | |
| 6,802,896 B2 * | 10/2004 | Kayali et al. | ................ 106/405 |

FOREIGN PATENT DOCUMENTS

| | | | |
|---|---|---|---|
| CN | 1121902 | | 5/1996 |
| CN | 1123781 | * | 6/1996 |
| CN | 1133271 | | 10/1996 |
| CN | 1145886 A | | 3/1997 |
| CN | 1188834 | | 7/1998 |
| CN | 1203895 | | 1/1999 |
| CN | 1212244 | | 3/1999 |
| CN | 1226529 | | 8/1999 |
| CN | 1268495 | * | 1/2000 |
| CN | 1246460 | | 3/2000 |
| CN | 1252393 | * | 5/2000 |
| CN | 1260336 | | 7/2000 |
| CN | 1268495 | | 10/2000 |
| CN | 1293295 | | 5/2001 |
| CN | 1301676 | | 7/2001 |
| CN | 1332128 | | 1/2002 |
| CN | 1339415 | | 3/2002 |
| CN | 1365955 | | 8/2002 |
| CN | 1398813 | * | 2/2003 |
| CN | 1398814 | | 2/2003 |
| GB | 2053876 | | 2/1981 |
| JP | 58115063 A | | 7/1983 |
| JP | 2217355 | | 8/1990 |
| JP | 7247156 | | 9/1995 |
| JP | 2003020265 | | 1/2003 |
| KR | 9311260 B1 | | 11/1990 |
| KR | 9309663 | | 10/1993 |
| KR | 9311260 | | 11/1993 |
| NL | 8100502 A | | 2/1981 |
| NL | 8100502 | | 9/1982 |
| PL | 129013 | * | 3/1984 |
| WO | WO99/42417 | | 8/1999 |
| WO | WO 02/092530 | | 11/2002 |
| ZA | 9400974 A | | 10/1994 |
| ZA | 9509833 A | | 9/1996 |

* cited by examiner

MANUFACTURE OF ARTICLES FROM FLY ASH

RELATED APPLICATION

This application is a continuation-in-part of U.S. patent application Ser. No. 09/996,528, filed Nov. 28, 2001 now U.S. Pat. No. 6,802,896, which claims priority on Australian Provisional Patent Application No. 2003905445 dated Oct. 3, 2003.

FIELD OF THE INVENTION

The present invention relates generally to shaped articles that are formed from fly ash and to methods of forming such articles. The invention has been developed especially, but not exclusively, for the manufacture of structural elements and the invention is herein described in that context. However it is to be appreciated that the invention has broader application and may be used for the production of a vast range of articles, both structural and non structural.

BACKGROUND OF THE INVENTION

Fly ash is a by-product from the burning of coal in coal fired power stations. Fly ash is made in abundance and typically contains heavy metals such as cadmium, chromium, zinc and lead that make disposal problematic. In trying to minimise the environmental impact of fly ash, various uses of fly ash have been contemplated to both aid in fly ash disposal and to obtain some economic return.

One such use is in the manufacture of bricks that contain fly ash as a constituent part. These bricks usually include fly ash blended with clay and are fire hardened. Whilst these bricks find a use for fly ash, they have not been seen as a viable structural building element. In particular, difficulties have been encountered in manufacturing bricks containing fly ash that are cost competitive with existing bricks, are of a consistent quality, and perform adequately over a range of structural properties.

SUMMARY OF THE INVENTION

In a first aspect, the present invention provides a method of forming a shaped article having a matrix containing sintered fly ash, said method comprising the steps of:

blending fly ash together with water to produce a fly ash dough, the water being added in excess of that which is absorbed by the fly ash so that the dough contains free water so as to be in at least a partially fluid state;

forming a green article in a desired shape from the fly ash dough, removing at least a portion of the free water from the fly ash dough during and/or after forming of the green article; and subsequently firing the green article so that the shaped article is hardened by sintering its fly ash matrix.

In a particular embodiment, a plasticiser is blended with the fly ash and water. The advantage of using a plasticiser is that it reduces the amount of free water that is required to make the dough in a workable state where it is at least partially fluid. This in turn alleviates the amount of water that may need to be subsequently removed to achieve the desired properties in the article, thereby allowing for more efficient processing of the article and also allowing for better control over the shape and size of the article during its production.

The method according to the above form is ideally suited to the manufacture of articles on a commercial scale. In one form, the method merely uses three ingredients, namely fly ash, water and a plasticiser. As fly ash is a by-product, it is an inexpensive and readily available constituent. Further, the method can be used in a production line fashion, akin to clay brick manufacture. By controlling the water content in the dough, the articles can be initially shaped without the need of a mould as the dough may exhibit adequate dimensional stability. Also, the properties of the article can be readily controlled by controlling the water content of the green article, and the firing temperature and duration. Each of these parameters can be controlled during manufacture thereby allowing for articles to be produced of consistent quality.

It is to be appreciated that other additives may be incorporated into the mixture if required. For example pigments may be incorporated to inpart certain coloration to the article. Also further additives may be incorporated to improve the properties of the mixture or resulting in green article. For example, quantities of carboxymethyl cellulose (CMC) may be incorporated in minute quantities to gel the mixture without the need of excessive water. Such additives also protect the dough from potential shrinkage, and cracking in the case of prolonged curing periods. Similar effects to that of CMC may also be obtained from the addition of minute quantities of calcium chloride solution.

The method of the invention has particular application for the manufacture of structural elements such as bricks. The inventors have found that bricks formed solely, or at least principally, from sintered fly ash have a higher compressive strength and modulus of rupture than conventional clay bricks. Also, by controlling the water content in the green article and the firing temperature and duration, it is possible to control the structure of the fly ash matrix and its surface characteristics. This in turn allows for the initial rate of absorption and absorption capacity of the article to be controlled, both of which are important properties, particularly in brick manufacture. Further, reducing the free water reduces the risk of bursting when the green article is fired and thus provides for a more uniform sintering process that is as free as possible from internal and external cracking.

In a particular embodiment of the method, the green article is cured before it is fired. During curing, the water reacts with the fly ash so as to solidify the article.

The solidification of the green article during this curing process may be contributable to several different reactions. Whilst not binding the invention to theory, the inventors consider that where the fly ash is the only cementitious material in the matrix, the only compound that can give certain quick solidification is the calcium oxide. This compound is available in small quantity in class F fly ash and in much larger quantities in class C fly ash. The reaction between water and calcium oxide results in the formation of calcium hydroxide which lends some solidification to the article. Subsequently, a pozzolanic reaction occurs where the main oxides in the fly ash, primarily the silica and the alumina, react with the calcium hydroxide to form a much harder and more cementing material than the hydroxide. The resulting material is a complex crystalline and amorphous mixture of products that contain in their lattice molecules of silicon oxides, aluminium oxides, calcium oxides and water.

In a particular embodiment, the free water is reduced from the matrix whilst the green article is cured. In preferred form, the green article is subjected to low to moderate heating during this curing process. The advantage of this arrangement is that the gentle heating can reduce the free water without causing undue cracking of the matrix. Also, the slow withdrawal of water still gives time for some of the water to react with the fly ash both by hydrating the cementitious material in the fly ash and under the pozzolanic reaction. In a particular embodiment, the moisture content in the green article is reduced during curing to between 1 and 5%, and more preferably between 2 and 4%.

In one form, the green article is heated under elevated humidity. The advantage of this arrangement is that it can promote the solidifying of the green article more evenly throughout the article.

This curing process consumes free water that is already in the dough and may need some additional water to compensate for self desiccation. In the preferred form the additional water can be drawn from the humid atmosphere.

In the process according to the above form, use is made of two separate reactions; first by gaining initial solidification through the formation of calcium hydroxide, and second by gaining further solidification through the pozzolanic reaction. If the process only relied on the former of these reactions, the solidification of the green article before firing would be limited due to the limited amount of calcium oxide in the fly ash. The advantage of solidifying the green article is that it improves its capacity to be handled, and its dimensional stability during firing, both of which are important in commercial manufacture of the shaped article.

In a preferred form, the green article is cured in a temperature in the range of 30° C. to 80° C. and more preferably in the range of 55° C. to 65° C.

In a preferred form, the green article is subjected to a humidity in the range of 20% relative humidity to 60% relative humidity and more preferably in the range of 35% relative humidity to 45% relative humidity.

As the curing is preferably done under gentle or moderate heat and high humidity, the duration of curing may vary considerably as extended curing time is unlikely to cause the matrix of green article to crack. Typically, for bricks, the curing time will be in the order of 12 hours to 5 days, and more preferably between 1 and 3 days. Whilst the curing is important to remove water and to solidify the green article, it is desirable to reduce the curing time to minimise the manufacturing process time. In one form, the inventors have found 2 days sufficient for curing.

In a preferred form, the majority, if not all, of the free water is removed prior to firing of the green article. As such, the porosity of the fired article can be better controlled as the firing process will not generate cracking or bursting as a result of water vaporising in the matrix.

As indicated above, the moisture content remaining in the green article prior to firing is in the range of 1% to 5% and more preferably in the range of 2% to 4%. Typically the moisture remaining in the article is made up of two components. The first is the moisture entered into the hydration reaction and produced solid products of calcium silicate and aluminium silicate hydrate complexes. The second part is that which is trapped as moisture within the internal pores. The first component resists crumbling of the brick during handling and to withstand internal pressures of the escaping gases during firing. The second component is a main source of porosity that remains in the brick structure.

Other techniques, such as pressing or the like of the dough or the green article may be used instead of, or in conjunction with, subjecting the article to a controlled environment of heat and humidity, to reduce the water content.

As indicated above the inventors have found that absorption properties of the fired article can be regulated by the temperature and duration of firing, particularly where the free water is substantially removed from the green article.

In the arrangement where the shaped articles are bricks, preferably the firing temperature is in the range of 1000° C. to 1300° C., and more preferably between 1100° C. to 1250° C. and the duration of firing is in the range of 30 minutes to 6 hours and more preferably in the range of 1 to 4 hours. The sintered fly ash matrix of bricks fired in this range are not glazed and exhibit excellent absorption characteristics both in terms of initial rate of absorption and absorption capacity.

In a further aspect, the invention relates to a building element having a matrix of sintered fly ash and having a compressive strength of greater than 30 MPa, a modulus of rupture greater than 5 Mpa, an initial rate of absorption (IRA) of between 0.2 to 5 $kg/m^2/min$ and an absorption capacity of between 5-20%.

Building elements formed with these properties are ideally suited as a direct replacement for conventional clay bricks. They are stronger than conventional clay bricks, particularly in tension, and are capable of bonding well with mortar due to their absorption properties. Whilst the strength of the elements is due to the sintered fly ash matrix, the absorption properties are due to the porosity of the elements and their surface characteristics. As such, the building elements according to this aspect of the invention are ideally suited to be manufactured by the earlier aspect of the invention where the porosity and surface characteristics can be controlled.

BRIEF DESCRIPTION OF THE DRAWINGS

It is convenient to herein after describe an embodiment of the present invention with reference to the accompanying drawings. It is to be appreciated that the particularity of the drawings and the related description is to be understood as not superseding the preceding broad description of the invention.

In the drawings.

DETAILED DESCRIPTION OF THE PREFERRED EMBODIMENT

Figure 1:
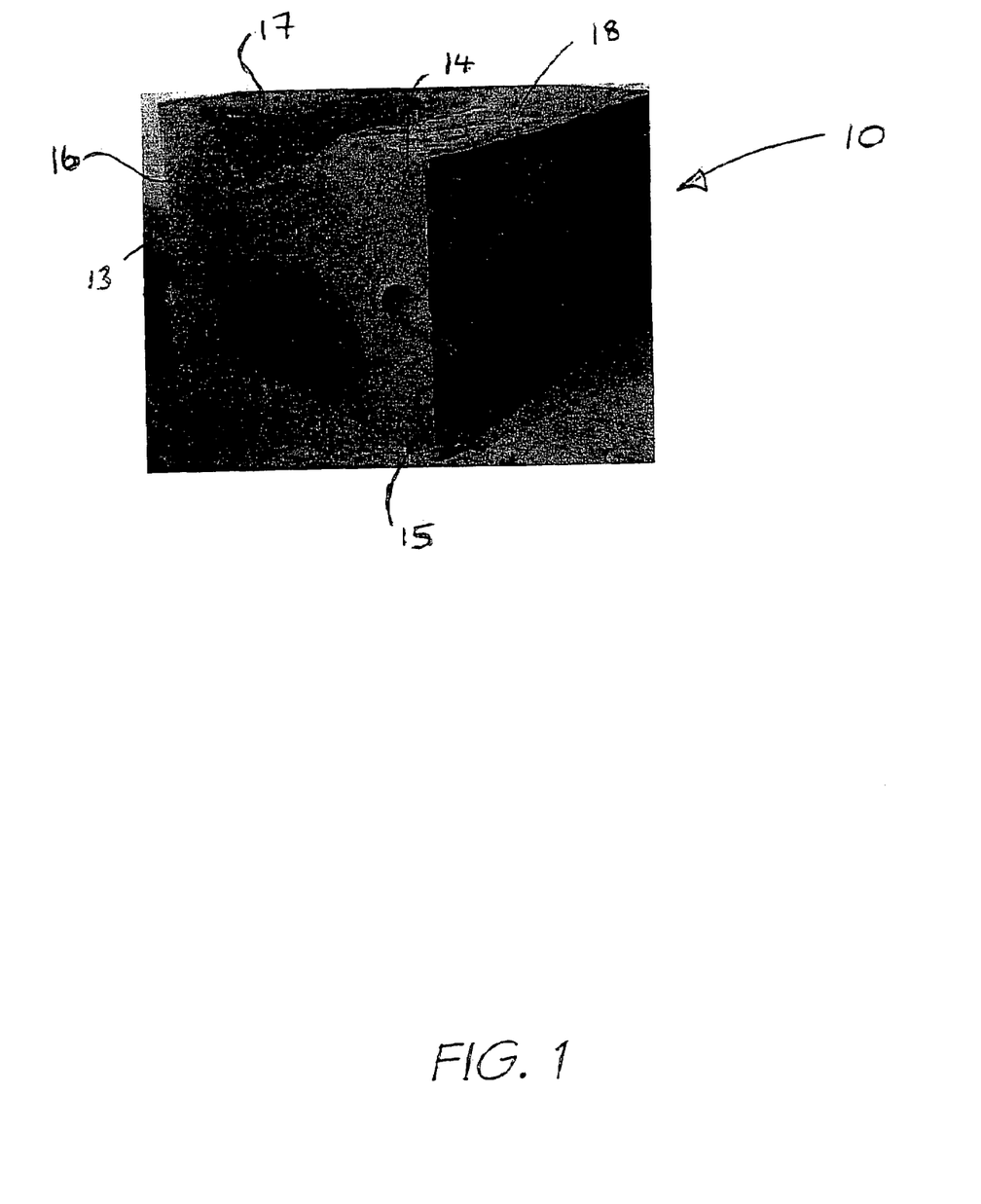
FIG. 1 is a photograph of a cross section of a brick having a sintered fly ash matrix.

Turning firstly to FIG. 1, a fly ash brick 10 is disclosed which incorporates a matrix 11 which is made from sintered fly ash 12 having voids 13 dispersed therethrough. The structure of the sintered fly ash and the arrangement and dispersion of the voids dictate the structural strength of the brick 10 and it's absorption capacity (both the initial rate of absorption as well as the total absorption capacity).

In general, the voids 13 are dispersed throughout the matrix and comprise predominantly small interconnected voids 14 and larger isolated voids 15. The small voids 14 make the brick 10 porous and capable of absorbing water. These small voids 14 are largely a function of the packing density of the fly ash, and the degree of compaction of the fly ash dough undertaken in manufacture of the brick. Of equal importance, these voids are a function of the efficiency of the sintering process that is controlled by the firing temperature and duration. The smaller voids 14 are also partly due to the plasticiser used in manufacture the dough. The inclusion of a plasticiser reduces the amount of water required to blend the fly ash dough whilst allowing ease of workability. The dispersant effect of the plasticiser is such that the water is held in the form of droplets that allow the fly ash particles to roll on them and when dried through evaporation and/or self desiccation, the droplets leave behind their traces as air bubbles.

Fly ash particles typically have a particle size ranging from 1 µm to 150 µm. Typically, more than 66% of fly ash particles have a diameter smaller than 45 µm. The median diameter ranges from 2 µm to 10 µm and the reactivity of the ash increases with the smaller size particles. While the packing density may be regulated by grading of the fly ash, the inventors have found that no such screening is required to give the required properties of strength and absorption capacity as detailed below. This has the distinct advantage that no pre-treating of the fly ash is required. The fly ash can be collected from source (typically a power station) and used directly as a constituent in the brick manufacturing process.

The fly ash used in the brick of FIG. 1 is Class F. Class F fly ash is produced from bituminous coal and is mainly silicious. According to ASTM classification, class F fly ash contains a total of at least 70% of its compounds being of silicon oxide, aluminium oxide and iron oxide. Another type of fly ash is known as class C fly ash. This is derived from sub-bituminous and lignite coal. Class C fly ash is rich with calcium oxide. Whilst the typical content of calcium oxide in class F fly ash is between 2-4% and is generally lower than 10%, the typical content of calcium oxide in class C fly ash is between 10% and 20% and can be as high as 26%. Whilst the inventors have used bituminous class F fly ash, it should be understood that this invention is not restricted to this type and is applicable to type C fly ash as well. Moreover, the high content of calcium oxide present in the class C fly ash serves to accelerate solidification and reduce the curing time and hence reduces the time required for handling and firing processes to proceed.

The larger voids 15 are formed primarily from air entrapped in the matrix when the brick is being formed. These voids 15 are partly a function of the manufacturing process and in particular the initial mixing of the fly ash and water to form a dough, and the compaction of that dough. The plasticiser through its dispersant and hydrophobic effect may also contribute to the formation of larger voids in the dried product.

Ideally, the matrix 11 does not include an excessive amount of the larger voids 15 as they weaken the matrix. However, these larger voids can contribute to the brick properties as they serve to alleviate possible pressure build-up while firing and serve to alleviate stresses that may occur in the finished product in places where freezing and thawing are encountered. As the brick 10 was manufactured under laboratory conditions, there was some restriction on controlling the presence of larger voids 15. It is anticipated that the generation of the larger voids would be better controlled under commercial procedures where the formation of the fly ash matrix could be better controlled.

As illustrated in the photograph of FIG. 1, the outer margins 16 of the brick, adjacent the outer peripheral edge 17, are still porous. Whilst the brick 10 incorporates a skin 18 formed on firing of the brick it is not glazed and still incorporates the smaller voids 14. As such the skin does not form a barrier to water penetration into the brick 10.

Also, there is an absence of major cracks or fissures extending through the brick matrix that would significantly reduce the brick strength and promote inconsistent water absorption of the brick.

The structure of the brick matrix 11 provides consistent strength and water absorption characteristics that make the brick 10 ideally suitable as a replacement for conventional clay bricks as will be discussed in more detail below.

Figure 2:
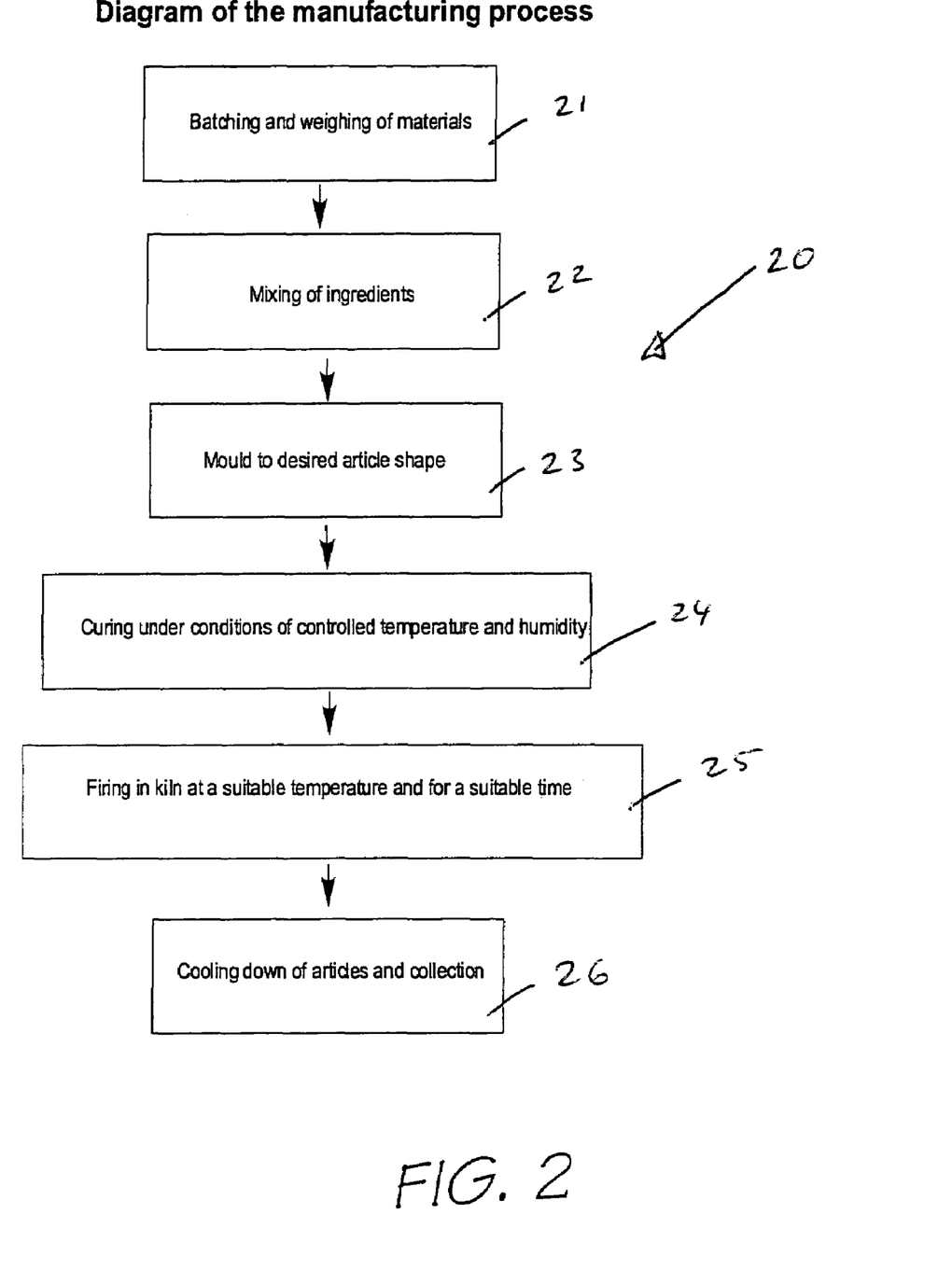
FIG. 2 is a flow chart illustrating the steps in manufacturing fly ash bricks.

FIG. 2 is a flow chart that schematically represents the process 20 of manufacturing the brick 10. In a first stage 21, the constituents of the brick are provided in their appropriate quantities. The constituents comprise fly ash, water and a plasticiser.

Fly ash was weighed and placed in a suitable concrete mixer or similar. About seventy percent of the total amount of water was then added and the dough mixture blended and rotated for three minutes. The total quantity of water to fly ash was 26 litres of water to 100 kg of fly ash. The fly ash used in this experiment was a Class F fly ash conforming to ASTM standard. This is available in abundance from power stations that use coal. However, it will be appreciated that the use of a particular fly ash is not a necessity although it should conform to a local quality standard.

A plasticiser, in this example a superplasticiser, was then added and mixing continued for another period of three minutes. The superplasticiser was used in order to facilitate the workability of the fly ash slurry or dough. The superplasticiser was a pure sodium salt of a polynapthalene sulphonate made by Handy Chemicals and commercially available under the trade name DISAL. However, it will be apparent that the use of a particular plasticiser is not necessary. It is only important to achieve consistent workability with minimum amount of water, and the use of a suitable plasticiser should be satisfactory provided the dosage is relevant to the particular superplasticiser that is used. In this case, where DISAL was the superplasticiser, the dosage was at the rate of 200 ml per 100 kg of fly ash.

The rest of the water was then added and the mixing was continued for three more minutes when the mixing was complete.

The mixing of the constituents to form the dough occurs at step 22. At that time, the dough may be compacted to limit the voids 13 (particularly the larger voids 14). The compaction may be done by any suitable technique and in the experiments carried out by the inventors, the fly ash dough was placed into a tray and compacted or vibrated on a vibrating table in a similar manner to concrete placing. The compaction or compression was stopped when the dough mixture started to bleed. However in a production environment, the fly ash dough would typically be mixed and extruded under pressure which would result in compaction of the dough.

At step 23, the green bricks are formed. In the experiments conducted, the dough was cut into the green bricks by cutter moulds forced into the dough. These bricks were then removed from the tray. In a commercial scale operation, where the dough is extruded, the brick would be produced in a manner adopted for clay brick manufacture where the dough would be fed on a conveyor belt and cut by wire cutters.

At step 24 the individual green articles are cured by being placed in a curing chamber at 58° C. and 37% relative humidity for a period of 48 hours. As indicated previously, the curing process is designed to solidify the green articles and also to draw out the majority of the water from the fly ash matrix.

Figure 5:
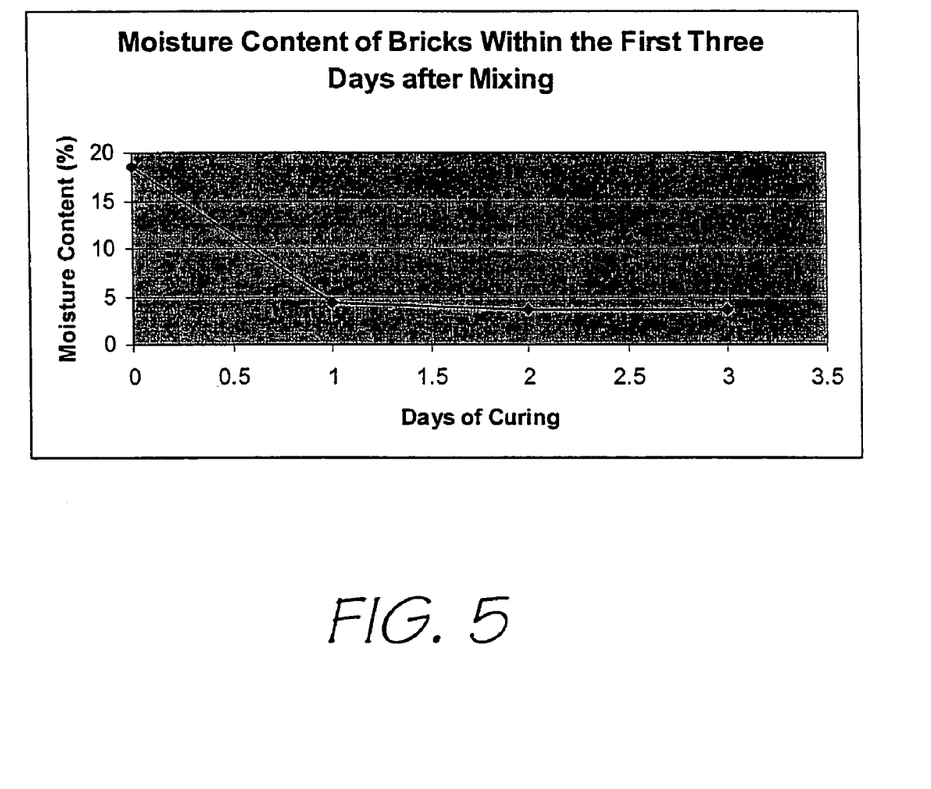

FIG. 5 is a graph of the moisture content of the green fly ash brink during curing. This graph shows the moisture content from the time of mixing until the time of firing which is typically between 24 to 72 hours after curing. It is evident that under the conditions of curing the moisture content stabilisers at about 3.5% after 48 hours. The main loss of moisture occurs within the first 24 hours. This period is the most critical for encouraging solidification and driving out unnecessary moisture. From two days onwards the remaining moisture is made up of two components. The first is the moisture that enters into the hydration reaction and produces solid products of calcium silicate and aluminium silicate hydrate complexes. The second part is that of which is trapped as moisture within the internal pores. The first component is necessary to resist crumbling of the brick during handling and to withstand internal pressure of the escaping gases during firing. The second component is a main source of porosity that remains in the brick structure. The cured bricks are then fired at step 25 so as to sinter the fly ash matrix. In the experiments, the cured articles were placed in a kiln and the temperature was raised to 1200° C. and the bricks were fired for 3.5 hours.

In a final stage of the process, the sintered fly ash bricks were then allowed to cool down to room temperature as represented at step 26.

Various properties of the fly ash brick were tested and table 1 below represents the properties of the fly ash bricks compared to common clay bricks.

are stronger than that and the 7.2 MPa is the strength of the glue. Hence the testing was done again on single bricks that involved no glue. The result confirmed that the value of the modulus of rupture fro the fly ash bricks is higher than 7.2 value and is in fact 10.3 MPa.

Initial Rate of Absorption: Performed according to Australian/New Zealand Standard AS/NZS 4456.17:1997, Method 17: Determining Initial Rate of Absorption (Suction).

Absorption Capacity: Performed according to Australian/New Zealand Standard AS/NZS 4456.14:1997, Method 14, Determining Water Absorption Properties.

Average Density: Performed according to Australian/New Zealand Standard AS/NZS 4456.8:1997 Method 8: Determining Moisture Content and Dry Density.

Accordingly, from the above table, it is clear that the fly ash bricks 10 exhibits excellent properties compared to conventional clay bricks.

Two important properties of building bricks are the initial rate of absorption (IRA) and the absorption capacity. These two properties are of particular importance for bricks. The IRA is of great importance for the laying of the bricks and bonding with the mortar. A high IRA results in too quick drying of the mortar and thus weakens the mortar and reduces its adherence to the brick. On the other hand if the IRA is too low, the surface of the brick adjacent to the mortar would not absorb the excess water and would result in very weak layer of the mortar that would not have penetrated enough into the surface crevices and pores of the brick. The property of total absorption capacity is also very important for the performance of the brick. A very high absorption

| Brick type | Compressive strength | Modulus of Rupture | Initial Rate of Absorption (IRA) | Absorption Capacity | Average Density |
|---|---|---|---|---|---|
| Clay Bricks | Typical is from 12 to 40 MPa. Minimum accepted by Australian Standard: 7 MPa. | From less than 1 MPa to greater than 2 MPa. Default value is 0.8 MPa. | Typical range between 0.2 and 5 kg/m$^2$/min. | 5-20% | 1800-2000 kg/m$^3$ |
| Fly Ash Brick | 43 MPa | 10.3 MPa | 4.5 kg/m$^2$/min | 10% | 1450 kg/m$^3$ |

The tests conducted to determine the above properties were as follows:

Compressive Strength: Performed according to Australian/New Zealand Standard AS/NZS 4456.4:1997, Method 4: Determining Compressive Strength of Masonry Units.

Modulus of Rupture: Performed twice, one time according to Australian/New Zealand Standard AS/NZS 4456.15:1997, Method 15: Determining Lateral Modulus of Rupture, and the second time on unit bricks. The reason why this was done is that the Standard method requires forming a beam by horizontally bonding three bricks. The glue used was Epirez, an epoxy mortar binder. This method worked very well with normal clay bricks because the glue is stronger in tension than the clay bricks and the failure line was through the brick. In the case of our fly ash bricks, failure occurred through the glue line at 7.2 MPa. This meant that the bricks results in vulnerability to volume changes that would result in cracking of the bricks and structural damage in buildings. It also would lead to cracking in the event of freezing and thawing of the water inside the pores. Too little absorption however is also not desired. This is because rain water, rather than get partially absorbed by the brick, would tend to run off very quickly towards the joints and may find its way into the building as well as reduce the durability of the mortar joints.

Further tests were conducted by the inventors on the effects of the firing temperature on the total absorption capacity and the initial rate of absorption. These tests were conducted using green bricks made in accordance with the above procedure. The only difference being the firing temperature used. The results of these tests are illustrated in FIGS. 3 and 4.

Figure 3:
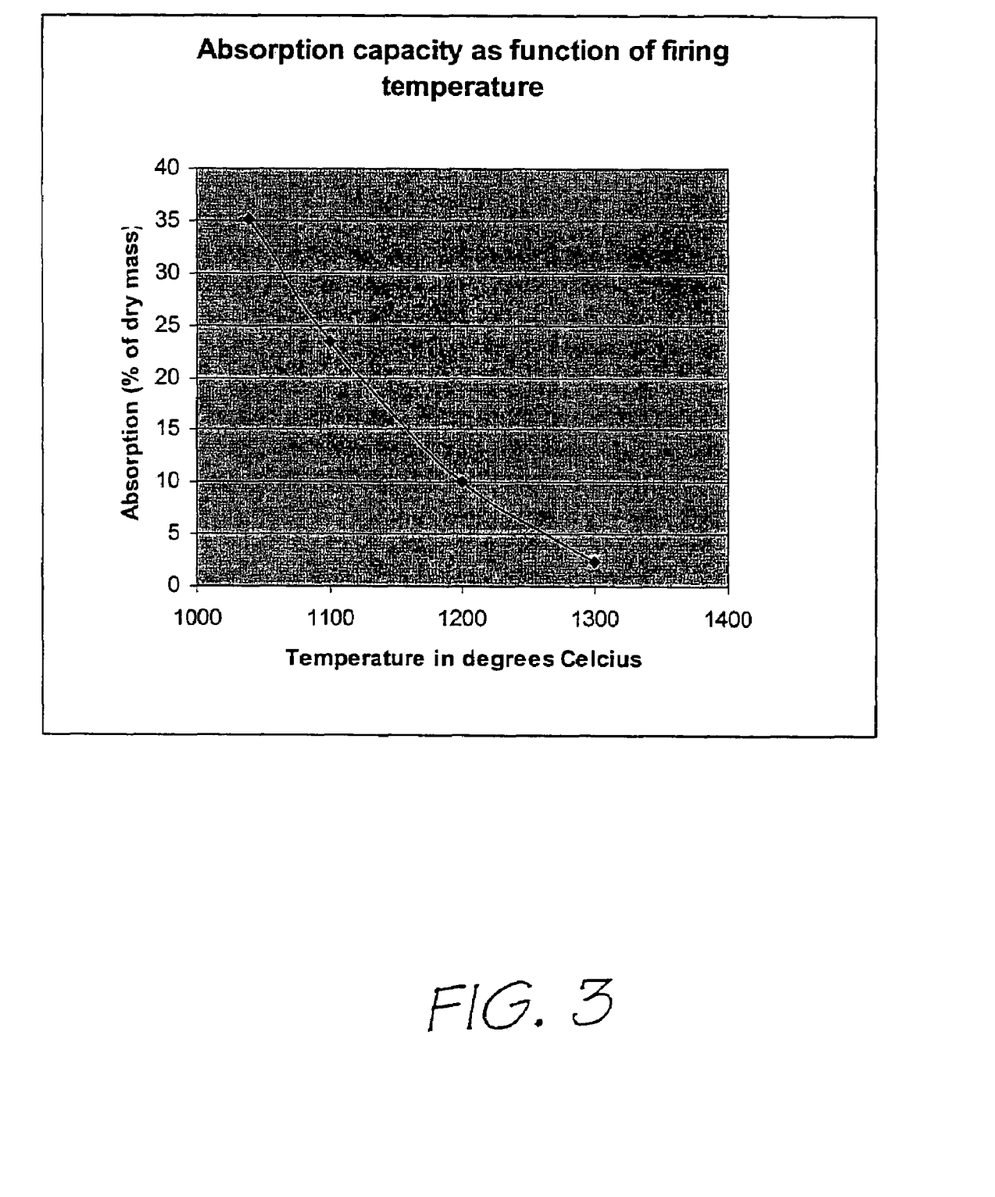
FIG. 3 is a graph of absorption capacity of a fly ash brick as a function of firing temperature.
Figure 4:
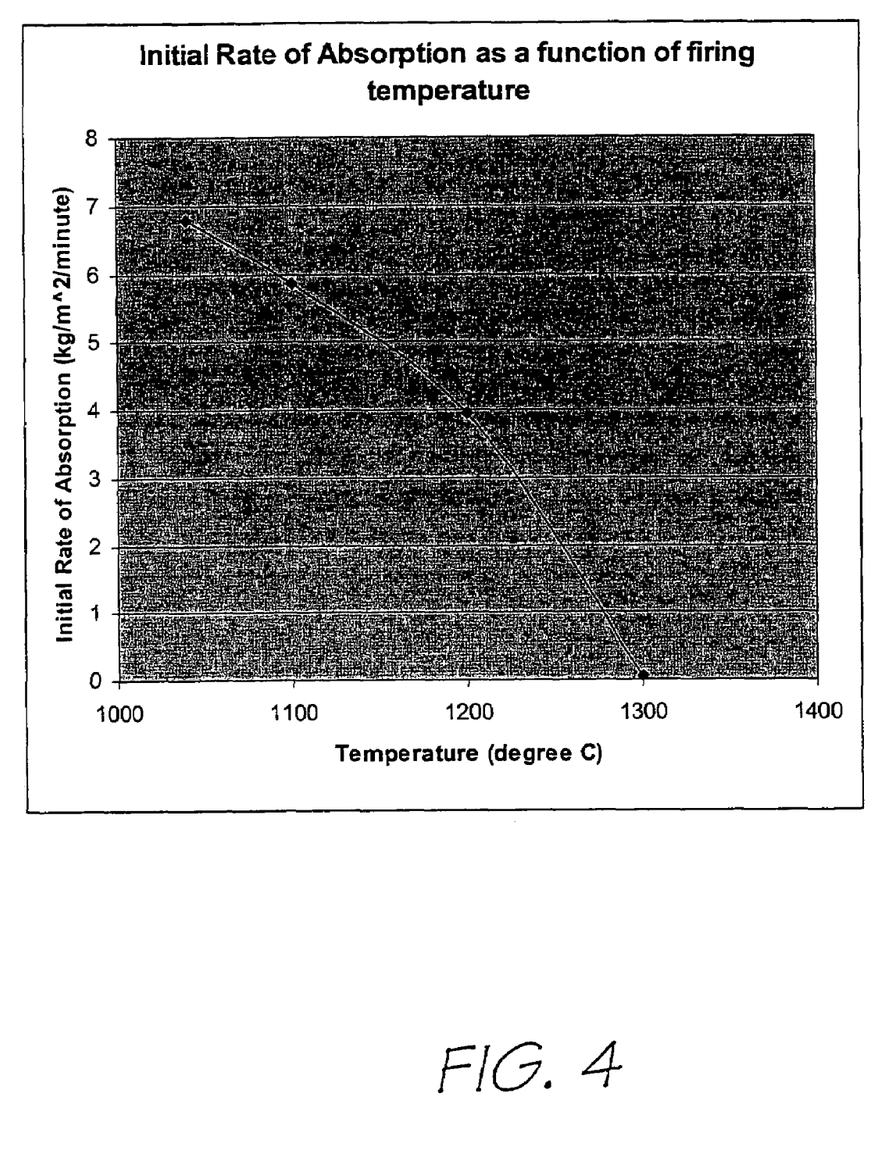
FIG. 4 is a graph of initial rate of absorption of the fly ash brick as a function of firing temperature.

As is clearly apparent from the FIGS. 3 and 4 is that the temperature of firing has a major effect on the absorption properties of the sintered fly ash bricks. Further, as can be seen from the above results, by maintaining the temperature rate between 1100° C. to 1250° C., it is possible to obtain excellent absorption properties consistent with conventional clay bricks.

Figure 6:
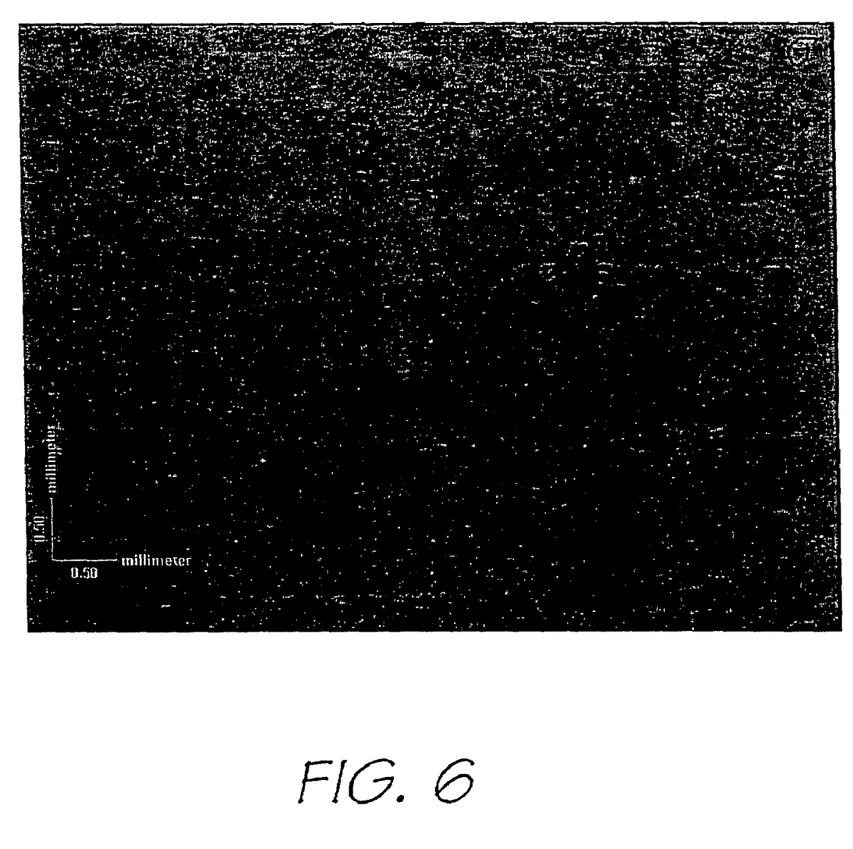
FIG. 6 in a micrograph of the fly ash brick matrix when fired at a temperature of 1200° C.
Figure 7:
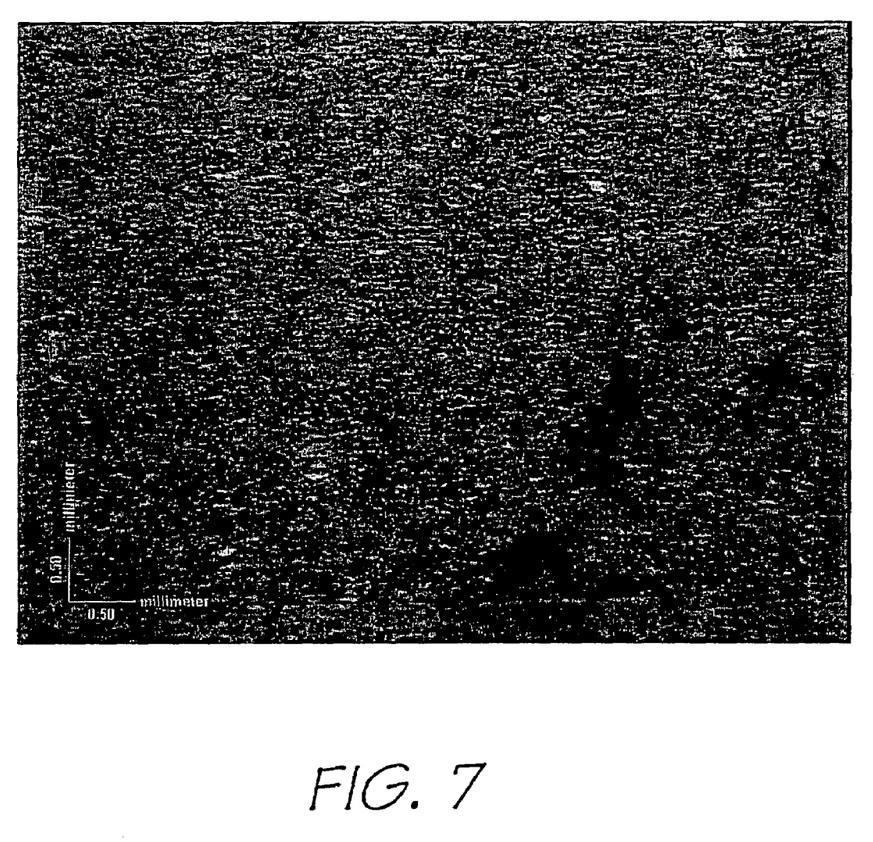
FIG. 7 is a micrograph of the fly ash brick matrix when fired at a temperature of 1040° C.

FIGS. 6 and 7 are micrographs of the fly ash brick matrix when fired at different temperatures. FIG. 6 has a firing temperature of 1200° C. whereas FIG. 7 is the brick matrix when fired at a temperature of 1040° C. In the micrograph of FIG. 6 the matrix of the brick exhibits finer and more consistent pores throughout the matrix structure. The fly ash is substantially sintered without being glassified. In contrast, in the matrix disclosed in FIG. 7, where the brick was fired at 1040° C., the fly ash is not sintered enough thereby leading to excessive porosity and a reduction in its structural strength.

Accordingly, the invention provides methods of manufacturing articles from fly ash which can be produced on a commercial scale and which exhibit excellent properties both in terms of strength and absorption capacity which makes such articles ideally suited as a substitute for conventional clay bricks.

In the claims which follow and in the preceding description of the invention, except where the context requires otherwise due to express language or necessary implication, the word "comprising" is used in an inclusive sense, i.e. the features specified may be associated with further features in various embodiments of the invention.

Variations and/or modifications may be made to the parts previously described without departing from the spirit or ambient of the present invention.

The invention claimed is:

1. A method of forming a shaped article having a matrix of sintered fly ash, said method comprising the steps of:
   blending fly ash, superplasticiser and water to produce a fly ash dough, the water being added in excess of that which is absorbed by the fly ash so that the dough contains free water so as to be in at least a partially fluid state;
   forming a green article from the fly ash dough,
   removing at least a portion of the free water from the fly ash dough during and/or after forming of the green article; and
   subsequently firing the green article so that the shaped article is hardened by sintering its fly ash to form a matrix, solely of sintered fly ash.

2. A method according to claim 1, further comprising the step of curing the green article by heating or air drying before it is fired, wherein during curing the water reacts with the fly ash so as to at least partially solidify the article.

3. A method according to claim 2, wherein during the curing of the green article by heating or air drying, at least a portion of the free water is removed from the fly ash dough.

4. A method according to claim 3, wherein the green article is subjected to heating during curing.

5. A method according to claim 4, wherein the green article is subjected to heating in a temperature range of 30° C. to 80° C.

6. A method according to claim 4, wherein the article is subjected to heating in a temperature range of 55° C. to 65° C.

7. A method according to claim 4, wherein the green article is subjected to humidity in the range of 20% relative humidity to 60% relative humidity.

8. A method according to claim 7, wherein the humidity is in the range of 35% relative humidity to 45% relative humidity.

9. A method according to claim 1, wherein after removing as least a portion of the free water from the fly ash dough, the moisture content in the dough is in the range of 1 to 5%.

10. A method according to claim 1, wherein after removing at least a portion of the free water from the fly ash dough, the moisture content in the dough is in the range of 2 to 4%.

11. A method according to claim 2, wherein the curing time is in between 12 hours to 5 days.

12. A method according to claim 2, wherein the curing time is between 1 and 3 days.

13. A method according to claim 1, wherein the firing temperature is in the range of 1000° C. to 1300° C.

14. A method according to claim 1, wherein the firing temperature is between 1100° C. and 1250° C.

15. A method according to claim 14, wherein the duration of firing is in the range of 30 minutes to 6 hours.

16. A method according to claim 14, wherein the duration of firing is between 1 to 4 hours.

17. A method according to claim 1, wherein the green article is a building brick and the firing temperature is in the range of 1100° C. to 1250° C.

18. A method of forming a shaped article having a matrix containing sintered fly ash, said method comprising the steps of:
   blending only fly ash, superplasticiser and water to form a dough, the water being added in excess of that which is absorbed by the fly ash so that the dough contains free water so as to be in at least a partially fluid state;
   forming a green article from the fly ash dough;
   removing at least a portion of the free water from the fly ash dough during and/or after forming of the green article; and
   subsequently firing the green article so that the green article is hardened by sintering its fly ash matrix.

* * * * *